(12) United States Patent
Krishnagi et al.

(10) Patent No.: US 12,423,144 B2
(45) Date of Patent: Sep. 23, 2025

(54) SYSTEM, METHOD, AND COMPUTER PROGRAM FOR APPLICATION CONTROLS ENABLEMENT

(71) Applicant: JPMorgan Chase Bank, N.A., New York, NY (US)

(72) Inventors: Kumar Rao Krishnagi, Powell, OH (US); Suresh Madhavan, Edison, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 479 days.

(21) Appl. No.: 18/092,713

(22) Filed: Jan. 3, 2023

(65) Prior Publication Data

US 2024/0220321 A1   Jul. 4, 2024

(51) Int. Cl.
*G06F 9/50* (2006.01)

(52) U.S. Cl.
CPC .................. *G06F 9/5016* (2013.01)

(58) Field of Classification Search
None
See application file for complete search history.

(56) References Cited

U.S. PATENT DOCUMENTS

2020/0110598 A1*  4/2020  Liu ................... G06F 21/31
2020/0195500 A1*  6/2020  Kishen ............. G06F 9/45558

* cited by examiner

*Primary Examiner* — Craig C Dorais
(74) *Attorney, Agent, or Firm* — GREENBLUM & BERNSTEIN, P.L.C.

(57) ABSTRACT

Various methods, apparatuses/systems, and media for enablement of application controls are disclosed. A processor implements a centralized database to serve as a system of record for application controls for an application, the centralized database storing control data associated with application controls; calls a first API to register the application controls associated with the application onto the centralized database; calls a second API to obtain the control data from the centralized database; develops control objectives and control procedures as rules to enable linkage of pre implementation validation checks for the application; integrates the centralized database with continuous integration and a continuous delivery (CICD) pipeline; executes the rules in the CICD pipeline to test the control data in a periodic manner; and automatically transmits the application to a production environment when it is determined that the control data passed the test executed by the CICD pipeline.

20 Claims, 11 Drawing Sheets

SYSTEM, METHOD, AND COMPUTER PROGRAM FOR APPLICATION CONTROLS ENABLEMENT

TECHNICAL FIELD

This disclosure generally relates to data management, and, more particularly, to methods and apparatuses for implementing a platform, language, cloud, and database agnostic application controls enablement module configured to establish a centralized system of record (SoR) for technology enabled business controls (i.e., application controls) and ensure consistent validation and post-production monitoring of applications.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, and competitive analysis, to name but a few. Typically, Information Technology (IT) general controls apply to all systems components, processes, and data present in an organization or systems environment. Application controls are typically managed by and pertain to individual application systems and vary based on business purpose, for example, data input or validation, workflow/business rules (e.g., routing, approvals), automated calculations, exception reporting and transaction logging, etc.

However, conventional systems for application controls do not ensure consistent validation and post-production monitoring of applications due to failing to operate for a tested application. For example, challenge authentication restrictions controls may fail to operate for a tested application in the following manners: password lockout may fail to operate after 25 invalid attempts; external customers may have the ability to re-use One-Time-Passcode (OTP) after the required expiration time, etc. Moreover, conventional systems have the following shortcomings: may not have a repository to track granular control logic for each application requirements (XL doc, PDF, bitbucket, config files etc.); lack of a standard way (definition language) to define the granular control logic; no standard framework for controls testing and no formal gating process prior to production implementation; no standard framework to support ongoing production monitoring of controls to ensure there are no gaps in coverage, etc., thereby exposing environment to unauthorized users.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic application controls enablement module configured to establish a centralized SoR for application controls, ensure consistent and complete application controls testing and gating process, ensure complete and consistent post-implementation monitoring and validation of operation of controls, track granular control logic for each application requirements (XL doc, PDF, bitbucket, config files etc.); define the granular control logic in a standard way (definition language); provide standard framework for controls testing and formal gating process prior to production implementation; provide standard framework to support ongoing production monitoring of controls to ensure that there are no gaps in coverage, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, cloud, and database agnostic application controls enablement module configured to implement a centralized registry to serve as an SoR for application controls, which may capture: control descriptions or attributes; cross references to strategic tool ecosystem (i.e., technology risk and control catalog); validation measures or scripts; production validation requirements or frequency or status, but the disclosure is not limited thereto.

According to exemplary embodiments, a method for enabling application controls by utilizing one or more processors along with allocated memory is disclosed. The method may include: implementing a centralized database to serve as an SoR for application controls for an application, the centralized database storing control data associated with application controls; calling a first application programing interface (API) to register the application controls associated with the application onto the centralized database; calling a second API to obtain the control data from the centralized database; developing control objectives and control procedures as rules to enable linkage of pre implementation validation checks for the application; integrating the centralized database with a continuous integration and continuous delivery (CICD) pipeline; executing the rules in the CICD pipeline to test the control data in a periodic manner; and automatically transmitting the application to a production environment when it is determined that the control data passed the test executed by the CICD pipeline.

According to exemplary embodiments, wherein the SoR for the application controls may capture the following data: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data, but the disclosure is not limited thereto.

According to exemplary embodiments, when it is determined that the control data failed the test executed by the CICD pipeline, the method may further include: identifying codes that failed.

According to exemplary embodiments, the method may further include: automatically notifying a developer of the application to correct the identified codes.

According to exemplary embodiments, the method may further include: creating a ticket to take remediation actions to correct the identified codes.

According to exemplary embodiments, in registering the application controls, the method may further include: executing governance or ownership around application controls documentation and validation requirements associated with control data; updating the centralized database with pre-implementation checkpoints related to any application updates or modifications associated with the application; and executing periodic certification to ensure controls documentation and validation tests in testing the control data remain accurate.

According to exemplary embodiments, the method may further include: dynamically tracking validation status of all test results.

According to exemplary embodiments, the method may further include: automatically alerting application owner services if the application controls are not validated in the periodic manner.

According to exemplary embodiments, the method may further include: creating a suite of control test status APIs for obtaining control testing result based on the test of the control data and storing control testing result in the centralized database for reporting and analysis; and modifying the CICD pipeline to integrate with the suite of control test status APIs to inform the control test results.

According to exemplary embodiments, the method may further include: integrating the centralized database with monitoring tools to monitor and validate the control test status APIs.

According to exemplary embodiments, a system for enabling application controls is disclosed. The system may include: a processor; and a memory operatively connected to the processor via a communication interface, the memory storing computer readable instructions, when executed, may cause the processor to: implement a centralized database to serve as an SoR for application controls for an application, the centralized database storing control data associated with application controls; call a first API to register the application controls associated with the application onto the centralized database; call a second API to obtain the control data from the centralized database; develop control objectives and control procedures as rules to enable linkage of pre implementation validation checks for the application; integrate the centralized database with a CICD pipeline; execute the rules in the CICD pipeline to test the control data in a periodic manner; and automatically transmit the application to a production environment when it is determined that the control data passed the test executed by the CICD pipeline.

According to exemplary embodiments, the processor may be further configured to capture the following data for the application controls: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data, but the disclosure is not limited thereto.

According to exemplary embodiments, when it is determined that the control data failed the test executed by the CICD pipeline, the processor may be further configured to: identify codes that failed.

According to exemplary embodiments, the processor may be further configured to: automatically notify a developer of the application to correct the identified codes.

According to exemplary embodiments, the processor may be further configured to: create a ticket to take remediation actions to correct the identified codes.

According to exemplary embodiments, in registering the application controls, the processor may be further configured to: execute governance or ownership around application controls documentation and validation requirements associated with control data; update the centralized database with pre-implementation checkpoints related to any application updates or modifications associated with the application; and execute periodic certification to ensure controls documentation and validation tests in testing the control data remain accurate.

According to exemplary embodiments, the processor may be further configured to: dynamically track validation status of all test results.

According to exemplary embodiments, the processor may be further configured to: automatically alert application owner services if the application controls are not validated in the periodic manner.

According to exemplary embodiments, the processor may be further configured to: create a suite of control test status APIs for obtaining control testing result based on the test of the control data and storing control testing result in the centralized database for reporting and analysis; and modify the CICD pipeline to integrate with the suite of control test status APIs to inform the control test results.

According to exemplary embodiments, the processor may be further configured to: integrate the centralized database with monitoring tools to monitor and validate the control test status APIs.

According to exemplary embodiments, a non-transitory computer readable medium configured to store instructions for enabling application controls is disclosed. The instructions, when executed, may cause a processor to perform the following: implementing a centralized database to serve as an SoR for application controls for an application, the centralized database storing control data associated with application controls; calling a first application programing interface (API) to register the application controls associated with the application onto the centralized database; calling a second API to obtain the control data from the centralized database; developing control objectives and control procedures as rules to enable linkage of pre implementation validation checks for the application; integrating the centralized database with a continuous integration and continuous delivery (CICD) pipeline; executing the rules in the CICD pipeline to test the control data in a periodic manner; and automatically transmitting the application to a production environment when it is determined that the control data passed the test executed by the CICD pipeline.

According to exemplary embodiments, when it is determined that the control data failed the test executed by the CICD pipeline, the instructions, when executed, may further cause the processor to perform the following: identifying codes that failed.

According to exemplary embodiments, the instructions, when executed, may further cause the processor to perform the following: automatically notifying a developer of the application to correct the identified codes.

According to exemplary embodiments, the instructions, when executed, may further cause the processor to perform the following: creating a ticket to take remediation actions to correct the identified codes.

According to exemplary embodiments, in registering the application controls, the instructions, when executed, may further cause the processor to perform the following: executing governance or ownership around application controls documentation and validation requirements associated with control data; updating the centralized database with pre-implementation checkpoints related to any application updates or modifications associated with the application; and executing periodic certification to ensure controls documentation and validation tests in testing the control data remain accurate.

According to exemplary embodiments, the instructions, when executed, may further cause the processor to perform the following: dynamically tracking validation status of all test results.

According to exemplary embodiments, the instructions, when executed, may further cause the processor to perform the following: automatically alerting application owner services if the application controls are not validated in the periodic manner.

According to exemplary embodiments, the instructions, when executed, may further cause the processor to perform the following: creating a suite of control test status APIs for obtaining control testing result based on the test of the control data and storing control testing result in the centralized database for reporting and analysis; and modifying the CICD pipeline to integrate with the suite of control test status APIs to inform the control test results.

According to exemplary embodiments, the instructions, when executed, may further cause the processor to perform the following: integrating the centralized database with monitoring tools to monitor and validate the control test status APIs.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6B illustrates another exemplary user interface implemented by the platform, language, database, and cloud agnostic application controls enablement module of FIG. 4 for adding control in accordance with an exemplary embodiment.

FIG. 6C illustrates another exemplary user interface implemented by the platform, language, database, and cloud agnostic application controls enablement module of FIG. 4 for updating controls in accordance with an exemplary embodiment.

DETAILED DESCRIPTION

Figure 1:
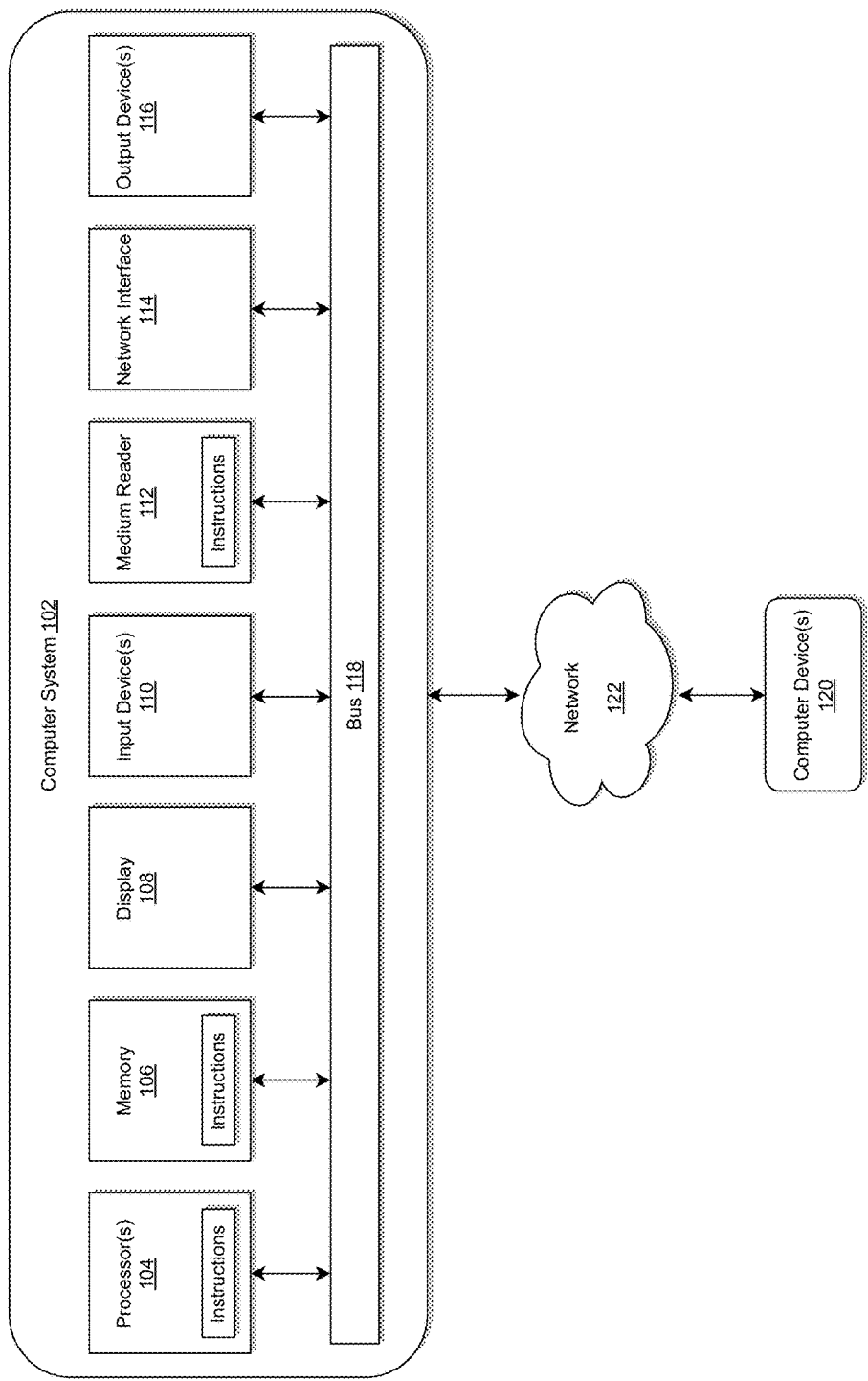
FIG. 1 illustrates a computer system for implementing a platform, language, database, and cloud agnostic application controls enablement module configured to establish a centralized SoR for application controls in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic application controls enablement module configured to establish a centralized SoR for application controls in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the application controls enablement module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the application controls enablement module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
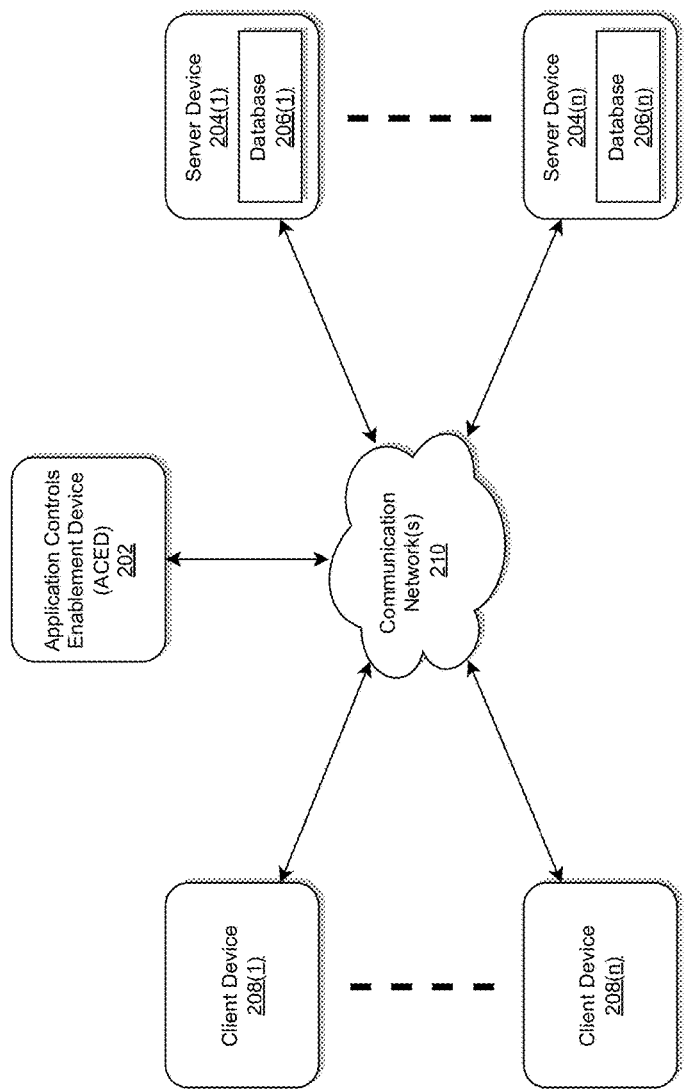
FIG. 2 illustrates an exemplary diagram of a network environment with a platform, language, database, and cloud agnostic application controls enablement device in accordance with an exemplary embodiment.

Referring to FIG. 2, a schematic of an exemplary network environment 200 for implementing a language, platform, database, and cloud agnostic application controls enablement device (ACED) of the instant disclosure is illustrated.

According to exemplary embodiments, the above-described problems associated with conventional tools may be overcome by implementing an ACED 202 as illustrated in FIG. 2 that may be configured for implementing a platform, language, cloud, and database agnostic application controls enablement module configured to establish a centralized SoR for application controls, ensure consistent and complete application controls testing and gating process, ensure complete and consistent post-implementation monitoring and validation of operation of controls, track granular control logic for each application requirements (XL doc, PDF, bitbucket, config files etc.); define the granular control logic in a standard way (definition language); provide standard framework for controls testing and formal gating process prior to production implementation; provide standard framework to support ongoing production monitoring of controls to ensure that there are no gaps in coverage, but the disclosure is not limited thereto.

The ACED 202 may be the same or similar to the computer system 102 as described with respect to FIG. 1.

The ACED 202 may store one or more applications that can include executable instructions that, when executed by the ACED 202, cause the ACED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ACED 202 itself, may be located in virtual server(s) running in a cloud-based computing environment rather than being tied to one or more specific physical network computing devices. Also, the application(s) may be running in one or more virtual machines (VMs) executing on the ACED 202. Additionally, in one or more embodiments of this technology, virtual machine(s) running on the ACED 202 may be managed or supervised by a hypervisor.

In the network environment 200 of FIG. 2, the ACED 202 is coupled to a plurality of server devices 204(1)-204(n) that hosts a plurality of databases 206(1)-206(n), and also to a plurality of client devices 208(1)-208(n) via communication network(s) 210. A communication interface of the ACED 202, such as the network interface 114 of the computer system 102 of FIG. 1, operatively couples and communicates between the ACED 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ACED 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ACED 202 may be a standalone device or integrated with one or more other devices or apparatuses, such as one or more of the server devices 204(1)-204(n), for example. In one particular example, the ACED 202 may be hosted by one of the server devices 204(1)-204(n), and other arrangements are also possible. Moreover, one or more of the devices of the ACED 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ACED 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ACED 202 that may efficiently provide a platform for implementing a platform, language, cloud, and database agnostic application controls enablement module configured to establish a centralized SoR for application controls, ensure consistent and complete application controls testing and gating process, ensure complete and consistent post-implementation monitoring and validation of operation of controls, track granular control logic for each application requirements (XL doc, PDF, bitbucket, config files etc.); define the granular control logic in a standard way (definition language); provide standard framework for controls testing and formal gating process prior to production implementation; provide standard framework to support ongoing production monitoring of controls to ensure that there are no gaps in coverage, but the disclosure is not limited thereto.

The client devices 208(1)-208(n) may run interface applications, such as standard web browsers or standalone client applications, which may provide an interface to communicate with the ACED 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ACED 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the ACED 202, the server devices 204(1)-204(n), or the client devices 208(1)-208(n), for example, may be configured to operate as virtual instances on the same physical machine. For example, one or more of the ACED 202, the server devices 204(1)-204(n), or the client devices 208(1)-208(n) may operate on the same physical device rather than as separate devices communicating through communication network(s) 210. Additionally, there may be more or fewer ACEDs 202, server devices 204(1)-204(n), or client devices 208(1)-208(n) than illustrated in FIG. 2. According to exemplary embodiments, the ACED 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
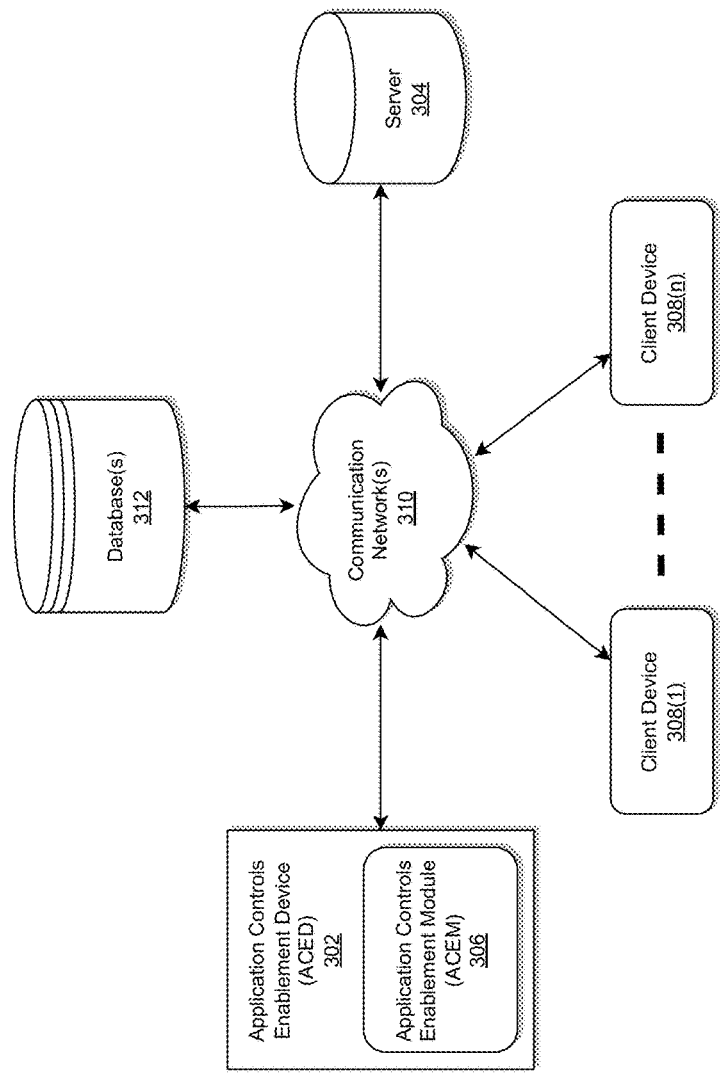
FIG. 3 illustrates a system diagram for implementing a platform, language, database, and cloud agnostic application controls enablement device having a platform, language, database, and cloud agnostic application controls enablement module in accordance with an exemplary embodiment.

FIG. 3 illustrates a system diagram for implementing a platform, language, and cloud agnostic ACED having a platform, language, database, and cloud agnostic application controls enablement module (ACEM) in accordance with an exemplary embodiment.

As illustrated in FIG. 3, the system 300 may include an ACED 302 within which an ACEM 306 is embedded, a server 304, a database(s) 312, a plurality of client devices 308(1) . . . 308(n), and a communication network 310.

According to exemplary embodiments, the ACED 302 including the ACEM 306 may be connected to the server 304, and the database(s) 312 via the communication network 310. The ACED 302 may also be connected to the plurality of client devices 308(1) . . . 308(n) via the communication network 310, but the disclosure is not limited thereto.

According to exemplary embodiment, the ACED 302 is described and shown in FIG. 3 as including the ACEM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the ACEM 306 may be configured to receive real-time feed of data from the plurality of client devices 308(1) . . . 308(n) and secondary sources via the communication network 310.

As may be described below, the ACEM 306 may be configured to: implement a centralized database to serve as an SoR for application controls for an application, the centralized database storing control data associated with application controls; call a first API to register the application controls associated with the application onto the centralized database; call a second API to obtain the control data from the centralized database; develop control objectives and control procedures as rules to enable linkage of pre implementation validation checks for the application; integrate the centralized database with a CICD pipeline; execute the rules in the CICD pipeline to test the control data in a periodic manner; and automatically transmit the application to a production environment when it is determined that the control data passed the test executed by the CICD pipeline, but the disclosure is not limited thereto.

The plurality of client devices 308(1) . . . 308(n) are illustrated as being in communication with the ACED 302. In this regard, the plurality of client devices 308(1) . . . 308(n) may be "clients" (e.g., customers) of the ACED 302 and are described herein as such. Nevertheless, it is to be known and understood that the plurality of client devices 308(1) . . . 308(n) need not necessarily be "clients" of the ACED 302, or any entity described in association therewith herein. Any additional or alternative relationship may exist between either or both of the plurality of client devices 308(1) . . . 308(n) and the ACED 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ACED 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ACED 302 may be the same or similar to the ACED 202 as described with respect to FIG. 2, including any features or combination of features described with respect thereto.

Figure 4:
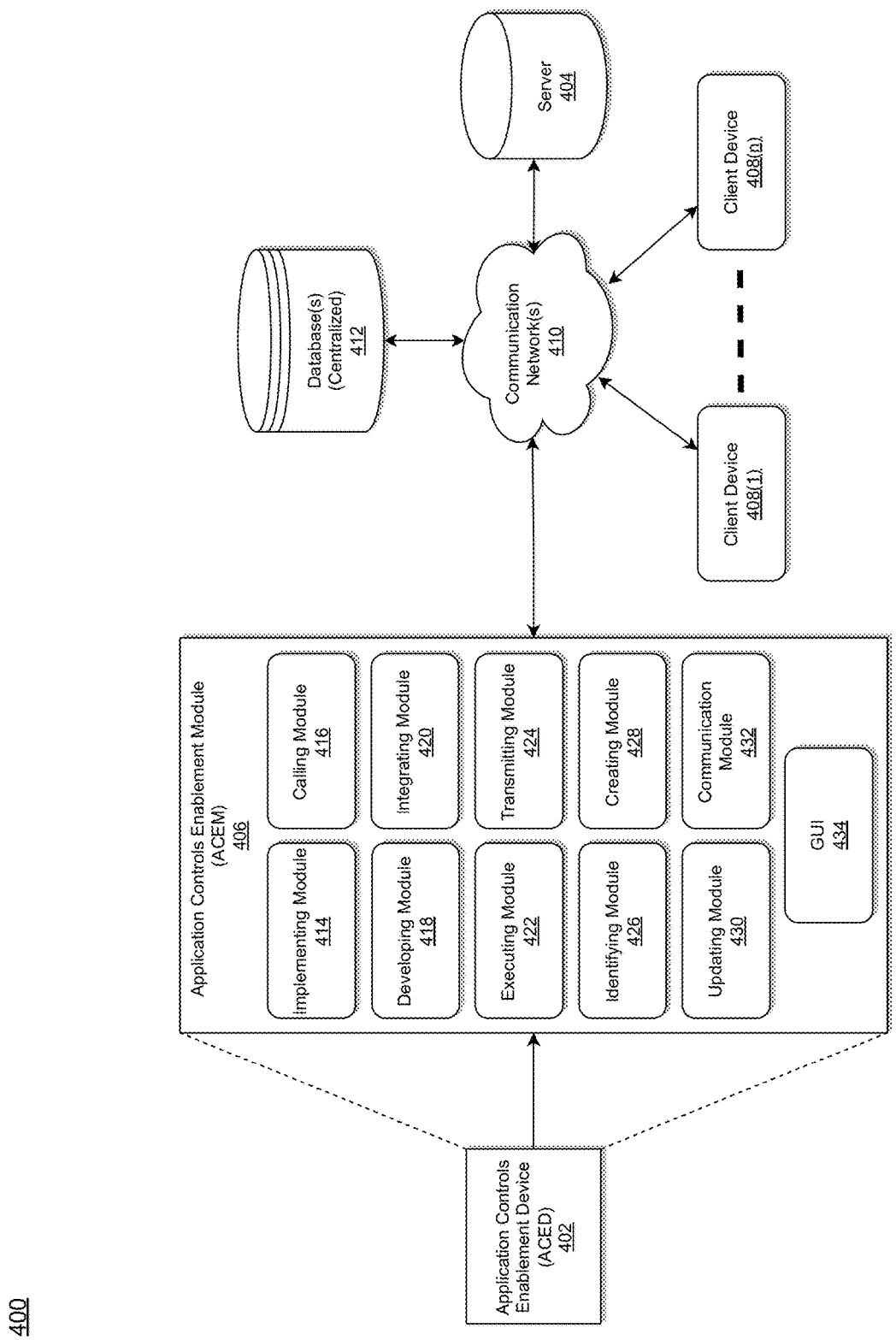
FIG. 4 illustrates a system diagram for implementing a platform, language, database, and cloud agnostic application controls enablement module of FIG. 3 in accordance with an exemplary embodiment.

FIG. 4 illustrates a system diagram for implementing a platform, language, database, and cloud agnostic ACEM of FIG. 3 in accordance with an exemplary embodiment.

According to exemplary embodiments, the system 400 may include a platform, language, database, and cloud agnostic ACED 402 within which a platform, language, database, and cloud agnostic ACEM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the ACED 402 including the ACEM 406 may be connected to the server 404 and the database(s) 412 via the communication network 410. The ACED 402 may also be connected to the plurality of client devices 408(1)-408(n) via the communication network 410, but the disclosure is not limited thereto. The ACEM 406, the server 404, the plurality of client devices 408(1)-408(n), the database(s) 412, the communication network 410 as illustrated in FIG. 4 may be the same or similar to the ACEM 306, the server 304, the plurality of client devices 308(1)-308(n), the database(s) 312, the communication network 310, respectively, as illustrated in FIG. 3.

According to exemplary embodiments, as illustrated in FIG. 4, the ACEM 406 may include an implementing module 414, a calling module 416, a developing module 418, an integrating module 420, an executing module 422, a transmitting module 424, an identifying module 426, a creating module 428, an updating module 430, a communication module 432, and a graphical user interface (GUI) 434. According to exemplary embodiments, interactions and data exchange among these modules included in the ACEM 406 provide the advantageous effects of the disclosed invention. Functionalities of each module of FIG. 4 may be described in detail below with reference to FIGS. 4-7.

According to exemplary embodiments, each of the implementing module 414, calling module 416, developing module 418, integrating module 420, executing module 422, transmitting module 424, identifying module 426, creating module 428, updating module 430, and the communication module 432 of the ACEM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, calling module 416, developing module 418, integrating module 420, executing module 422, transmitting module 424, identifying module 426, creating module 428, updating module 430, and the communication module 432 of the ACEM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, calling module 416, developing module 418, integrating module 420, executing module 422, transmitting module 424, identifying module 426, creating module 428, updating module 430, and the communication module 432 of the ACEM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the implementing module 414, calling module 416, developing module 418, integrating module 420, executing module 422, transmitting module 424, identifying module 426, creating module 428, updating module 430, and the communication module 432 of the ACEM 406 of FIG. 4 may be called via corresponding API.

According to exemplary embodiments, the process implemented by the ACEM 406 may be executed via the communication module 432 and the communication network 410, which may comprise plural networks as described above. For example, in an exemplary embodiment, the various components of the ACEM 406 may communicate with the server 404, and the database(s) 412 via the communication module 430 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
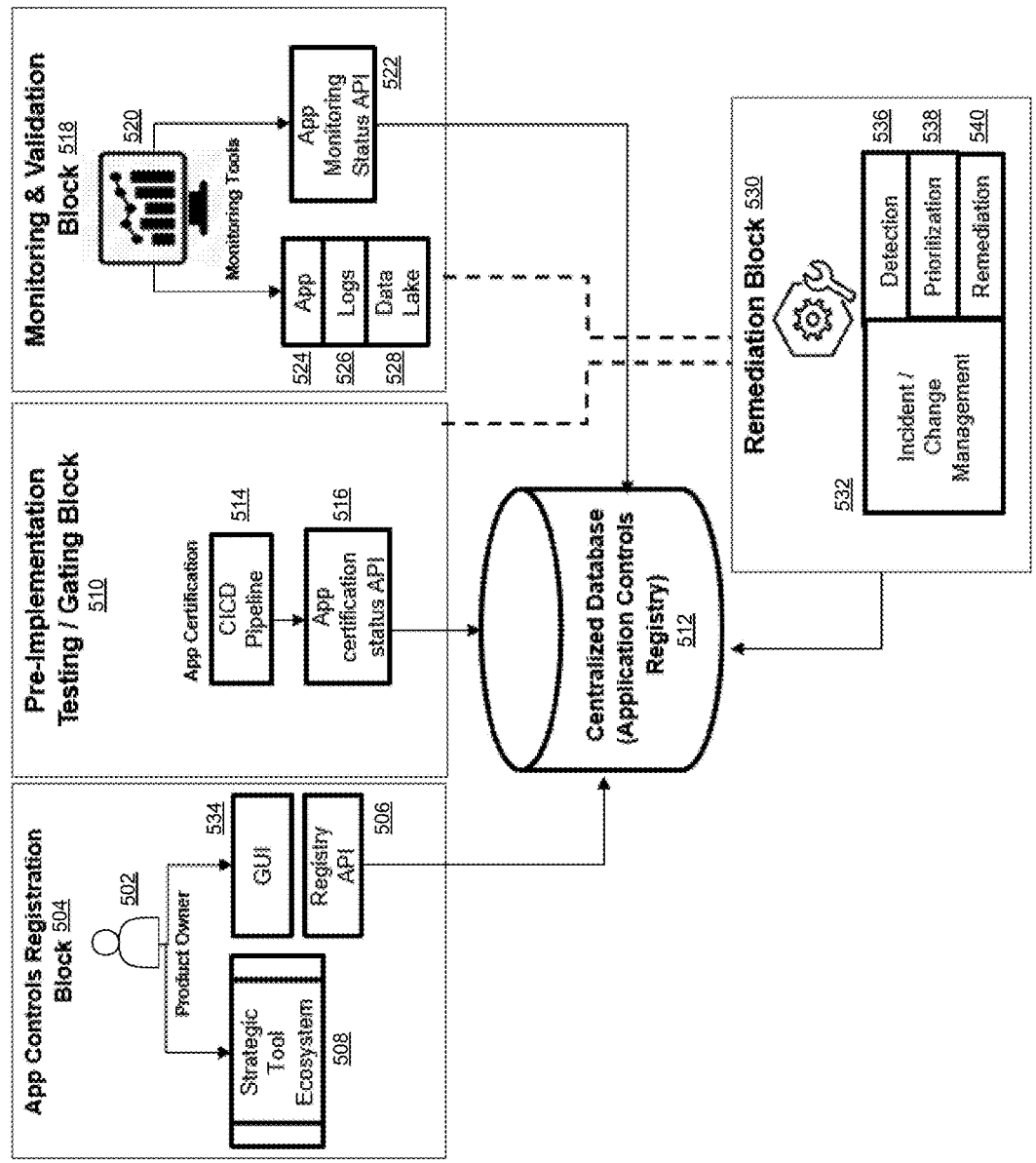
FIG. 5 illustrates an exemplary architecture as implemented by the platform, language, database, and cloud agnostic application controls enablement module of FIG. 4 in accordance with an exemplary embodiment.

According to exemplary embodiments, the database(s) 412 may be a centralized database from which the ACEM 406 may capture the following data for the application controls: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data, but the disclosure is not limited thereto FIG. 5 illustrates an exemplary architecture 500 as implemented by the platform, language, database, and cloud agnostic ACEM 406 of FIG. 4 in accordance with an exemplary embodiment. As illustrated in the exemplary architecture diagram 500 of FIG. 5, an application controls registration block 504, a pre-implementation testing or gating block 510, a monitoring and validation block 518, and a remediation block 530 are all interconnected via a common connection to a centralized database 512 (i.e., an application controls registry). The centralized database 512 may be the same or similar to the database(s) 412 as illustrated in FIG. 4.

As illustrated in FIG. 5, the application controls registration block 504 may include strategic tool ecosystem 508, a GUI 534 (same or similar to the GUI 434 as illustrated in FIG. 4), and a registry API 506. The pre-implementation testing or gating block 510 may include a CICD pipeline 514 and application certification status API 516. The monitoring and validation block 518 may include monitoring tools 520 that can utilize an application monitoring status API 522, the application 524, logs data 526, and data lake 528 for monitoring and validation purposes of the control data. The remediation block 530 may include a component for detection 536 of failed or passed test codes; a component for prioritization 538 of the failed test codes; and a component for remediation 540 of the failed test codes. The incident or change management block 532 may control each of the components (i.e., 536, 538, 540)

For example, referring back to FIGS. 4-5, the implementing module 414 may be configured to implement a centralized database, 412, 512 to serve as an SoR for application controls for an application 524, the centralized database 412, 512 storing control data associated with application controls. The ACEM 406 configured to capture the following data as control data for the application controls from the centralized database 412, 512: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data, but the disclosure is not limited thereto.

According to exemplary embodiments, the calling module 416 may be configured to call a first API, i.e., registry API 506, to register the application controls associated with the application 524 onto the centralized database 412, 512. The calling module 416 may be further configured to call a second API to obtain the control data from the centralized database 412, 512.

According to exemplary embodiments, the developing module 418 may be configured to develop control objectives and control procedures as rules to enable linkage of pre implementation validation checks for the application 524 performed in the pre-implementation testing or gating block 510. The integrating module 420 may be configured to integrate the centralized database 412, 512 with the CICD pipeline 514 (i.e., Jules). The executing module 422 may be further configured to execute the rules in the CICD pipeline 514 to test the control data in a periodic manner. The transmitting module 424 may be configured to automatically transmit the application 524 to a production environment of the CICD pipeline 514 when it is determined that the control data passed the test executed by the CICD pipeline 514.

According to exemplary embodiments, when it is determined that the control data failed the test executed by the CICD pipeline 514, the identifying module 426 may be further configured to identify codes that failed.

According to exemplary embodiments, the transmitting module 424 may be further configured to automatically notify a developer or product owner 502 of the application to correct the identified codes.

According to exemplary embodiments, the creating module 428 may be further configured to create a ticket to take remediation actions to correct the identified codes by the remediation block 530.

According to exemplary embodiments, in registering the application controls, the executing module 422 may be further configured to execute governance or ownership around application controls documentation and validation requirements associated with control data; the updating module 430 may be configured to update the centralized database 412, 512 with pre-implementation checkpoints related to any application updates or modifications associated with the application; and the executing module 422 may be further configured to execute periodic certification, performed in the pre-implementation testing or gating block 510, by utilizing the application certification status API 516, 522 to ensure controls documentation and validation tests, performed in the monitoring and validation block 518, in testing the control data remain accurate.

According to exemplary embodiments, the updating module 430 may be further configured to dynamically track validation status of all test results by utilizing the remediation block 530.

According to exemplary embodiments, the transmitting module 424 along with the communication module 432 may be further configured to automatically alert application owner services if the application controls are not validated in the periodic manner.

According to exemplary embodiments, the creating module 428 may be further configured to create a suite of control test status APIs for obtaining control testing result based on the test of the control data and storing control testing result in the centralized database 412, 512 for reporting and analysis. The ACEM 406 may modify the CICD pipeline 514 to integrate with the suite of control test status APIs to inform the control test results.

According to exemplary embodiments, the integrating module 420 may be further configured to integrate the centralized database 412, 512 with the monitoring tools 520 to monitor and validate the control test status APIs by utilizing the application monitoring status API 522.

Figure 6A:
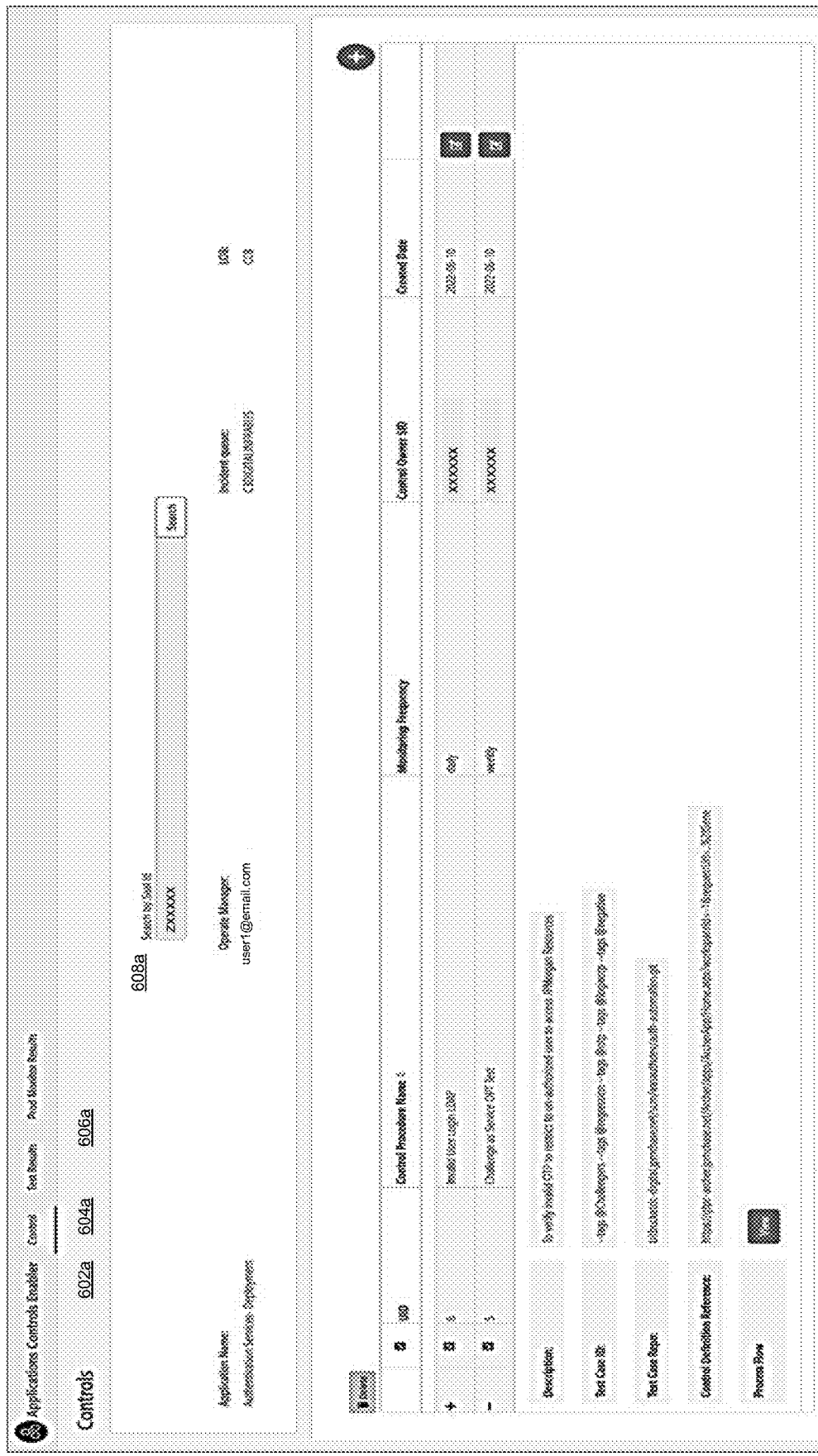
FIG. 6A illustrates an exemplary user interface implemented by the platform, language, database, and cloud agnostic application controls enablement module of FIG. 4 for displaying controls in accordance with an exemplary embodiment.

For example, FIG. 6A illustrates an exemplary user interface 600a implemented by the platform, language, database, and cloud agnostic ACEM 406 of FIG. 4 for displaying controls in accordance with an exemplary embodiment. As illustrated in FIG. 6A, the exemplary user interface 600a includes a tab for control 602a, a tab for test results 604a, a tab for production monitor results 606a. Controls can be performed or searched by seal identifier 608a.

Figure 6B:
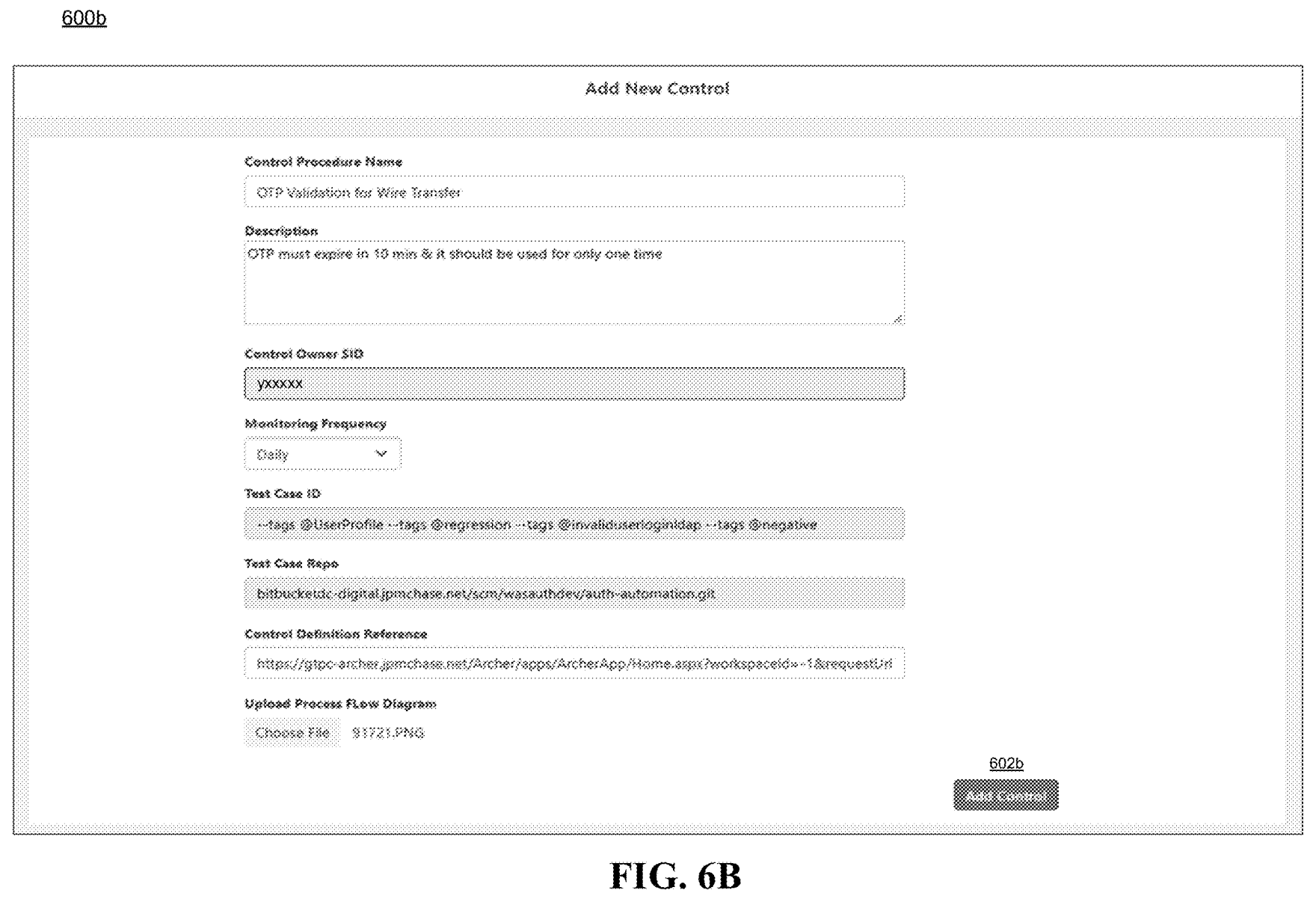

FIG. 6B illustrates another exemplary user interface 600b implemented by the platform, language, database, and cloud agnostic ACEM 406 of FIG. 4 for adding control in accordance with an exemplary embodiment. As illustrated in FIG. 6B, the exemplary user interface 600b includes a tab for "add control" 602b. A user can add new control by inserting data related to control procedure name, description, control owner SID, monitoring frequency, test case ID, test case repository, control definition reference and update process flow diagram, etc.

Figure 6C:
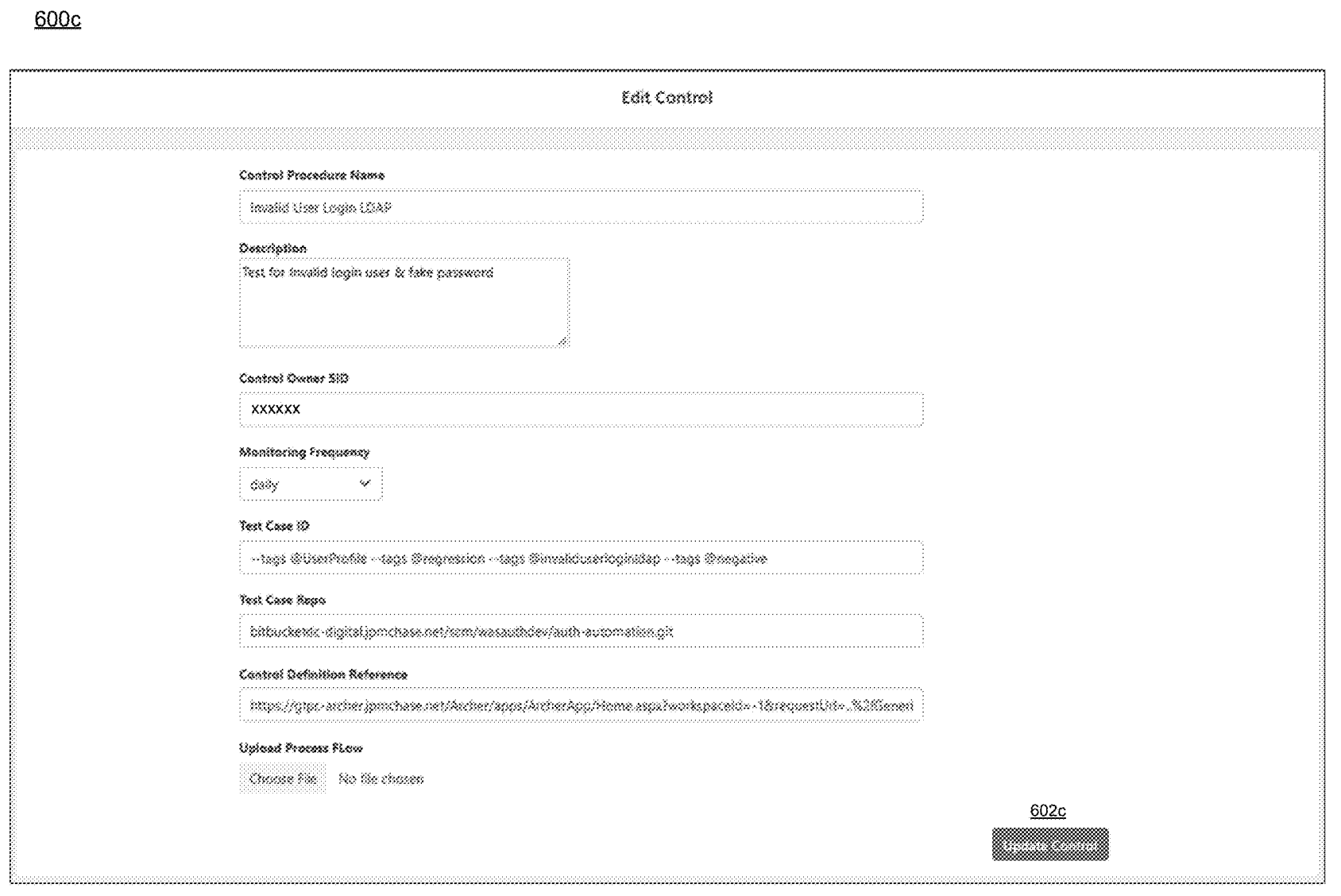

FIG. 6C illustrates another exemplary user interface 600c implemented by the platform, language, database, and cloud agnostic ACEM 406 of FIG. 4 for updating/editing controls in accordance with an exemplary embodiment. As illustrated in FIG. 6C, the exemplary user interface 600c includes a tab for "update control" 602c. A user can edit/update the control by inserting data related to control procedure name, description, control owner SID, monitoring frequency, test case ID, test case repository, control definition reference and update process flow diagram, etc.

Figure 6D:
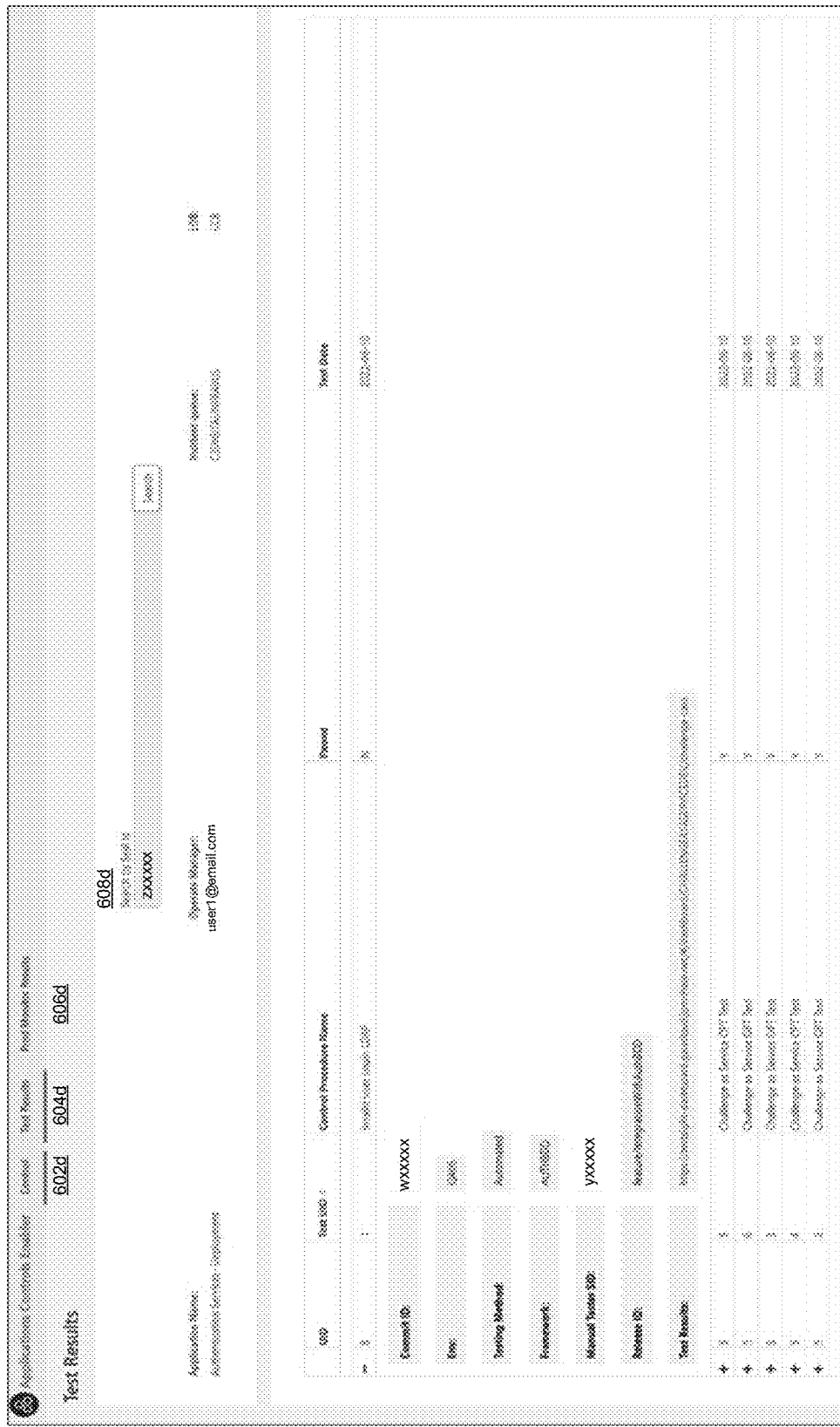
FIG. 6D illustrates another exemplary user interface implemented by the platform, language, database, and cloud agnostic application controls enablement module of FIG. 4 for displaying test results from non-production build in accordance with an exemplary embodiment.

FIG. 6D illustrates another exemplary user interface 600d implemented by the platform, language, database, and cloud agnostic ACEM 406 of FIG. 4 for displaying test results from non-production build in accordance with an exemplary embodiment. As illustrated in FIG. 6D, the exemplary user interface 600d includes a tab for control 602d, a tab for test results 604d, a tab for production monitor results 606d. The test results can be performed or searched by seal identifier 608d.

Figure 6E:
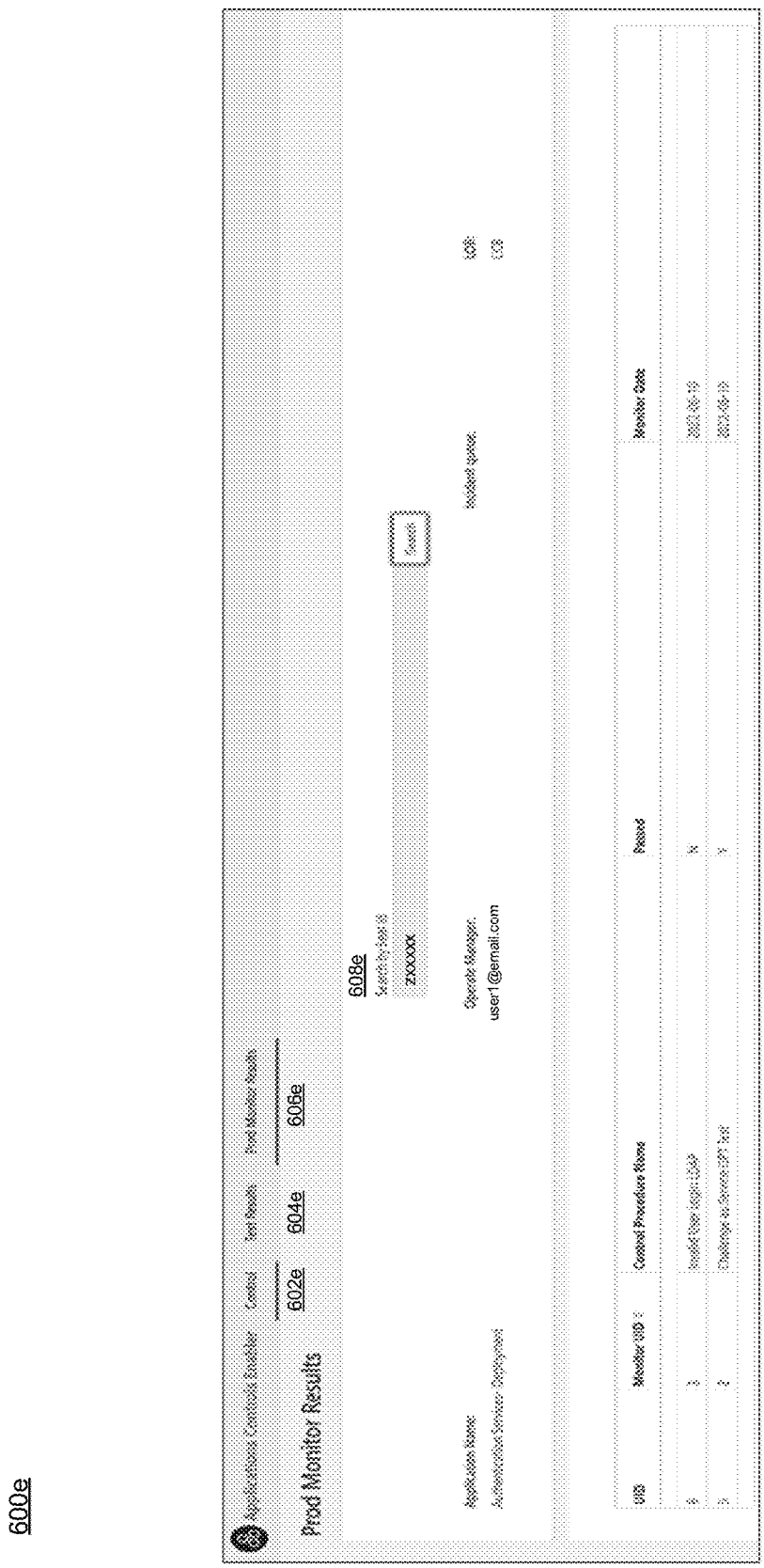
FIG. 6E illustrates an exemplary user interface implemented by the platform, language, database, and cloud agnostic application controls enablement module of FIG. 4 for displaying production monitoring control results in accordance with an exemplary embodiment.

FIG. 6E illustrates an exemplary user interface 600e implemented by the platform, language, database, and cloud agnostic ACEM 406 of FIG. 4 for displaying production monitoring control results in accordance with an exemplary embodiment. As illustrated in FIG. 6E, the exemplary user interface 600e includes a tab for control 602e, a tab for test results 604e, a tab for production monitor results 606e. The production monitoring control results can be performed or searched by seal identifier 608e.

Figure 7:
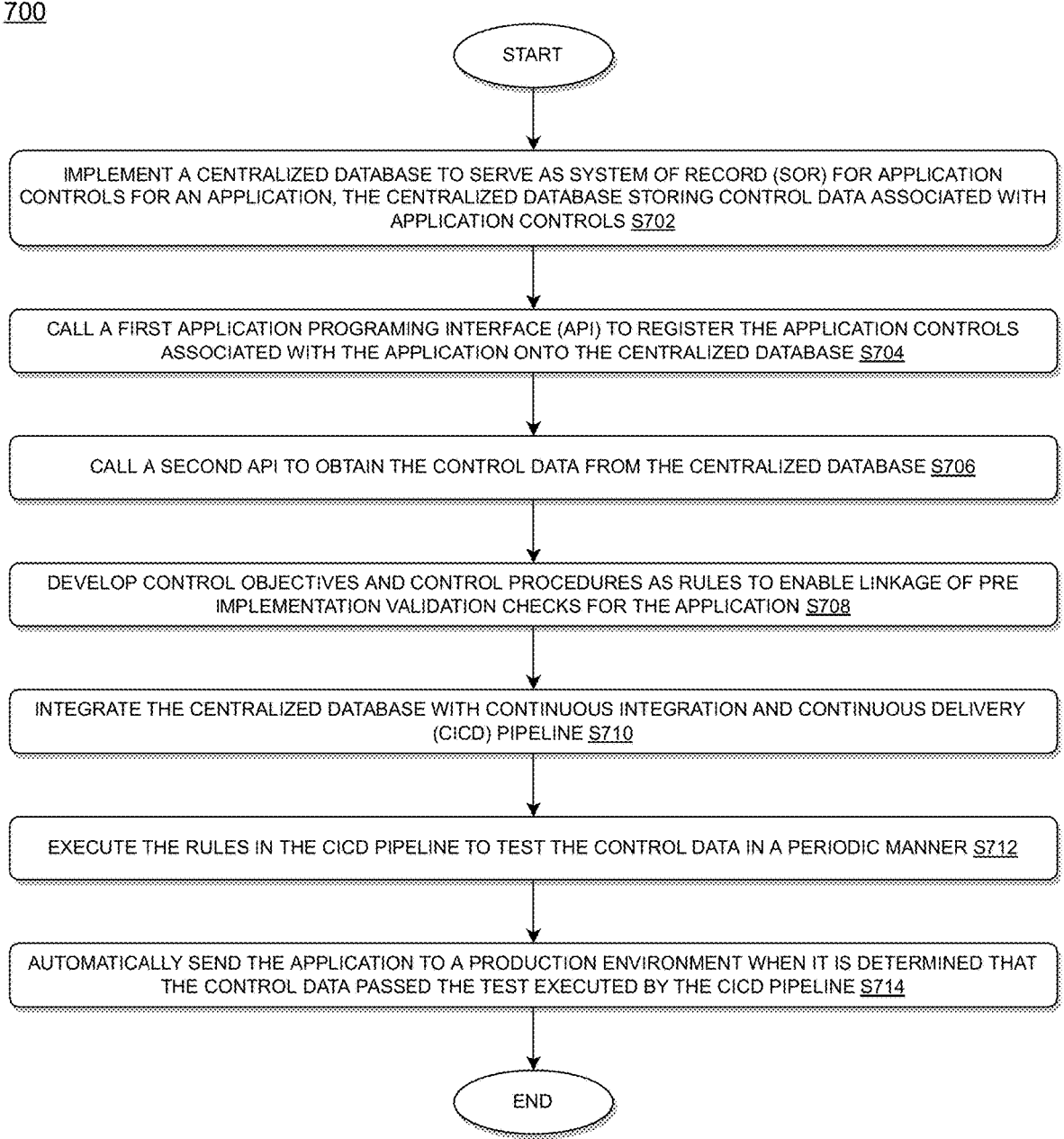
FIG. 7 illustrates an exemplary flow diagram implemented by the platform, language, database, and cloud agnostic application controls enablement module of FIG. 4 for establishing a centralized SoR for application controls in accordance with an exemplary embodiment.

FIG. 7 illustrates an exemplary flow chart 700 implemented by the platform, language, database, and cloud agnostic ACEM 406 of FIG. 4 for enabling application controls in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include implementing a centralized database to serve as an SoR for application controls for an application, the centralized database storing control data associated with application controls.

At step S704, the process 700 may include calling a first application programing interface (API) to register the application controls associated with the application onto the centralized database.

At step S706, the process 700 may include calling a second API to obtain the control data from the centralized database.

At step S708, the process 700 may include developing control objectives and control procedures as rules to enable linkage of pre implementation validation checks for the application.

At step S710, the process 700 may include integrating the centralized database with continuous integration and a continuous delivery (CICD) pipeline.

At step S712, the process 700 may include executing the rules in the CICD pipeline to test the control data in a periodic manner.

At step S714, the process 700 may include automatically transmitting the application to a production environment when it is determined that the control data passed the test executed by the CICD pipeline.

According to exemplary embodiments, in the process 700, the SoR for the application controls may capture the following data: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data, but the disclosure is not limited thereto.

According to exemplary embodiments, when it is determined that the control data failed the test executed by the CICD pipeline, the process 700 may further include: identifying codes that failed.

According to exemplary embodiments, the process 700 may further include: automatically notifying a developer of the application to correct the identified codes.

According to exemplary embodiments, the process 700 may further include: creating a ticket to take remediation actions to correct the identified codes.

According to exemplary embodiments, in registering the application controls, the process 700 may further include: executing governance or ownership around application controls documentation and validation requirements associated with control data; updating the centralized database with pre-implementation checkpoints related to any application updates or modifications associated with the application; and executing periodic certification to ensure controls documentation and validation tests in testing the control data remain accurate.

According to exemplary embodiments, the process 700 may further include: dynamically tracking validation status of all test results.

According to exemplary embodiments, the process 700 may further include: automatically alerting application owner services if the application controls are not validated in the periodic manner.

According to exemplary embodiments, the process 700 may further include: creating a suite of control test status APIs for obtaining control testing result based on the test of the control data and storing control testing result in the centralized database for reporting and analysis; and modifying the CICD pipeline to integrate with the suite of control test status APIs to inform the control test results.

According to exemplary embodiments, the process 700 may further include: integrating the centralized database with monitoring tools to monitor and validate the control test status APIs.

According to exemplary embodiments, the ACED 402 may include a memory (e.g., a memory 106 as illustrated in FIG. 1) which may be a non-transitory computer readable medium that may be configured to store instructions for implementing a platform, language, database, and cloud agnostic ACEM 406, for enabling application controls as disclosed herein. The ACED 402 may also include a medium reader (e.g., a medium reader 112 as illustrated in FIG. 1) which may be configured to read any one or more sets of instructions, e.g., software, from any of the memories described herein. The instructions, when executed by a processor embedded within the ACEM 406, or within the ACED 402, may be used to perform one or more of the methods and processes as described herein. In a particular embodiment, the instructions may reside completely, or at least partially, within the memory 106, the medium reader 112, and/or the processor 104 (see FIG. 1) during execution by the ACED 402.

According to exemplary embodiments, the instructions, when executed, may cause a processor embedded within the ACEM 406, or the ACED 402 to perform the following: implementing a centralized database to serve as an SoR for application controls for an application, the centralized database storing control data associated with application controls; calling a first API to register the application controls associated with the application onto the centralized database; calling a second API to obtain the control data from the centralized database; developing control objectives and control procedures as rules to enable linkage of pre implementation validation checks for the application; integrating the centralized database with a CICD pipeline; executing the rules in the CICD pipeline to test the control data in a periodic manner; and automatically transmitting the application to a production environment when it is determined that the control data passed the test executed by the CICD pipeline.

According to exemplary embodiments, when it is determined that the control data failed the test executed by the CICD pipeline, the instructions, when executed, may further cause the processor 104 to perform the following: identifying codes that failed.

According to exemplary embodiments, the instructions, when executed, may further cause the processor 104 to perform the following: automatically notifying a developer of the application to correct the identified codes.

According to exemplary embodiments, the instructions, when executed, may further cause the processor 104 to perform the following: creating a ticket to take remediation actions to correct the identified codes.

According to exemplary embodiments, in registering the application controls, the instructions, when executed, may further cause the processor 104 to perform the following: executing governance or ownership around application controls documentation and validation requirements associated with control data; updating the centralized database with pre-implementation checkpoints related to any application updates or modifications associated with the application; and executing periodic certification to ensure controls documentation and validation tests in testing the control data remain accurate.

According to exemplary embodiments, the instructions, when executed, may further cause the processor 104 to perform the following: dynamically tracking validation status of all test results.

According to exemplary embodiments, the instructions, when executed, may further cause the processor 104 to perform the following: automatically alerting application owner services if the application controls are not validated in the periodic manner.

According to exemplary embodiments, the instructions, when executed, may further cause the processor 104 to perform the following: creating a suite of control test status APIs for obtaining control testing result based on the test of the control data and storing control testing result in the centralized database for reporting and analysis; and modifying the CICD pipeline to integrate with the suite of control test status APIs to inform the control test results.

According to exemplary embodiments, the instructions, when executed, may further cause the processor 104 to perform the following: integrating the centralized database with monitoring tools to monitor and validate the control test status APIs.

According to exemplary embodiments as disclosed above in FIGS. 1-7, technical improvements effected by the instant disclosure may include a platform for implementing a platform, language, database, and cloud agnostic application controls enablement module configured to establish a centralized SoR for application controls, ensure consistent and complete application controls testing and gating process, ensure complete and consistent post-implementation monitoring and validation of operation of controls, track granular control logic for each application requirements (XL doc, PDF, bitbucket, config files etc.); define the granular control logic in a standard way (definition language); provide standard framework for controls testing and formal gating process prior to production implementation; provide standard framework to support ongoing production monitoring of controls to ensure that there are no gaps in coverage, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling application controls by utilizing one or more processors along with allocated memory, the method comprising:

implementing a centralized database to serve as a system of record (SoR) for application controls for an application, the centralized database storing control data associated with application controls;

calling a first application programing interface (API) to register the application controls associated with the application onto the centralized database;

calling a second API to obtain the control data from the centralized database;

developing control objectives and control procedures as rules to enable linkage of pre implementation validation checks for the application;
integrating the centralized database with continuous integration and a continuous delivery (CICD) pipeline;
executing the rules in the CICD pipeline to test the control data in a periodic manner; and
automatically transmitting the application to a production environment when it is determined that the control data passed the test executed by the CICD pipeline.

2. The method according to claim 1, wherein the SoR for the application controls captures the following data: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data.

3. The method according to claim 1, wherein, when it is determined that the control data failed the test executed by the CICD pipeline, the method further comprising:
identifying codes that failed.

4. The method according to claim 3, further comprising:
automatically notifying a developer of the application to correct the identified codes.

5. The method according to claim 3, further comprising:
creating a ticket to take remediation actions to correct the identified codes.

6. The method according to claim 1, wherein in registering the application controls, the method further comprising:
executing governance or ownership around application controls documentation and validation requirements associated with control data;
updating the centralized database with pre-implementation checkpoints related to any application updates or modifications associated with the application; and
executing periodic certification to ensure controls documentation and validation tests in testing the control data remain accurate.

7. The method according to claim 1, further comprising:
dynamically tracking validation status of all test results.

8. The method according to claim 7, further comprising:
automatically alerting application owner services if the application controls are not validated in the periodic manner.

9. The method according to claim 7, further comprising:
creating a suite of control test status APIs for obtaining control testing result based on the test of the control data and storing control testing result in the centralized database for reporting and analysis; and
modifying the CICD pipeline to integrate with the suite of control test status APIs to inform the control test results.

10. The method according to claim 9, further comprising:
integrating the centralized database with monitoring tools to monitor and validate the control test status APIs.

11. A system for enabling application controls, the system comprising:
a processor; and
a memory operatively connected to the processor via a communication interface, the memory storing computer readable instructions, when executed, causes the processor to:
implement a centralized database to serve as a system of record (SoR) for application controls for an application, the centralized database storing control data associated with application controls;
call a first application programing interface (API) to register the application controls associated with the application onto the centralized database;
call a second API to obtain the control data from the centralized database;
develop control objectives and control procedures as rules to enable linkage of pre implementation validation checks for the application;
integrate the centralized database with continuous integration and a continuous delivery (CICD) pipeline;
execute the rules in the CICD pipeline to test the control data in a periodic manner; and
automatically transmit the application to a production environment when it is determined that the control data passed the test executed by the CICD pipeline.

12. The system according to claim 11, wherein the SoR for the application controls captures the following data: control descriptions or attributes data associated with application controls; cross reference data received by cross referencing the control descriptions or attributes data to predefined technology risk and control catalog; validation measures or scripts data associated with the application controls; production validation requirements data; production validation frequency data; and production validation status data.

13. The system according to claim 11, wherein, when it is determined that the control data failed the test executed by the CICD pipeline, the processor is further configured to:
identify codes that failed.

14. The system according to claim 13, wherein the processor is further configured to:
automatically notify a developer of the application to correct the identified codes.

15. The system according to claim 13, wherein the processor is further configured to:
create a ticket to take remediation actions to correct the identified codes.

16. The system according to claim 11, wherein in registering the application controls, the processor is further configured to:
execute governance or ownership around application controls documentation and validation requirements associated with control data;
update the centralized database with pre-implementation checkpoints related to any application updates or modifications associated with the application; and
execute periodic certification to ensure controls documentation and validation tests in testing the control data remain accurate.

17. The system according to claim 11, wherein the processor is further configured to:
dynamically track validation status of all test results; and
automatically alert application owner services if the application controls are not validated in the periodic manner.

18. The system according to claim 17, wherein the processor is further configured to:
create a suite of control test status APIs for obtaining control testing result based on the test of the control data and storing control testing result in the centralized database for reporting and analysis; and
modify the CICD pipeline to integrate with the suite of control test status APIs to inform the control test results.

19. The system according to claim 18, wherein the processor is further configured to:
   integrate the centralized database with monitoring tools to monitor and validate the control test status APIs.

20. A non-transitory computer readable medium configured to store instructions for enabling application controls, the instructions, when executed, cause a processor to perform the following:
   implementing a centralized database to serve as a system of record (SoR) for application controls for an application, the centralized database storing control data associated with application controls;
   calling a first application programing interface (API) to register the application controls associated with the application onto the centralized database;
   calling a second API to obtain the control data from the centralized database;
   developing control objectives and control procedures as rules to enable linkage of pre implementation validation checks for the application;
   integrating the centralized database with continuous integration and a continuous delivery (CICD) pipeline;
   executing the rules in the CICD pipeline to test the control data in a periodic manner; and
   automatically transmitting the application to a production environment when it is determined that the control data passed the test executed by the CICD pipeline.

* * * * *